Nov. 28, 1933.                J. A. WADE                1,936,650
                                 VALVE
                          Filed May 13, 1931
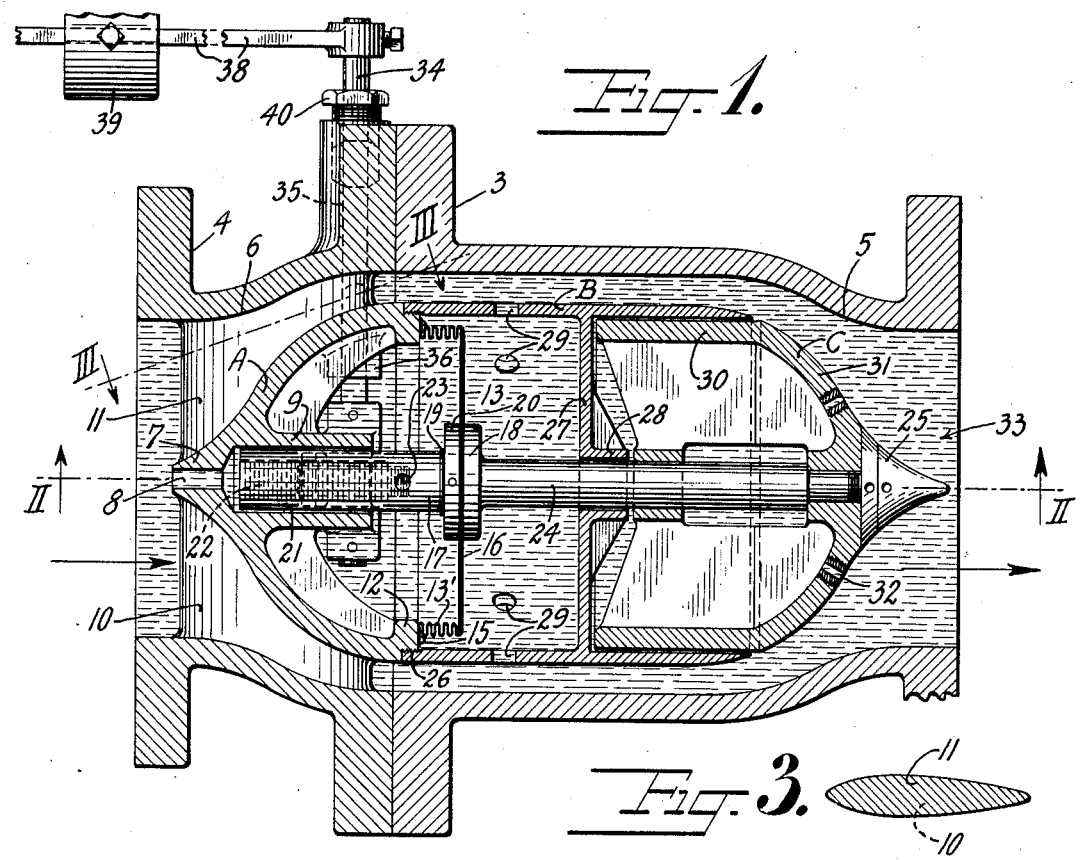
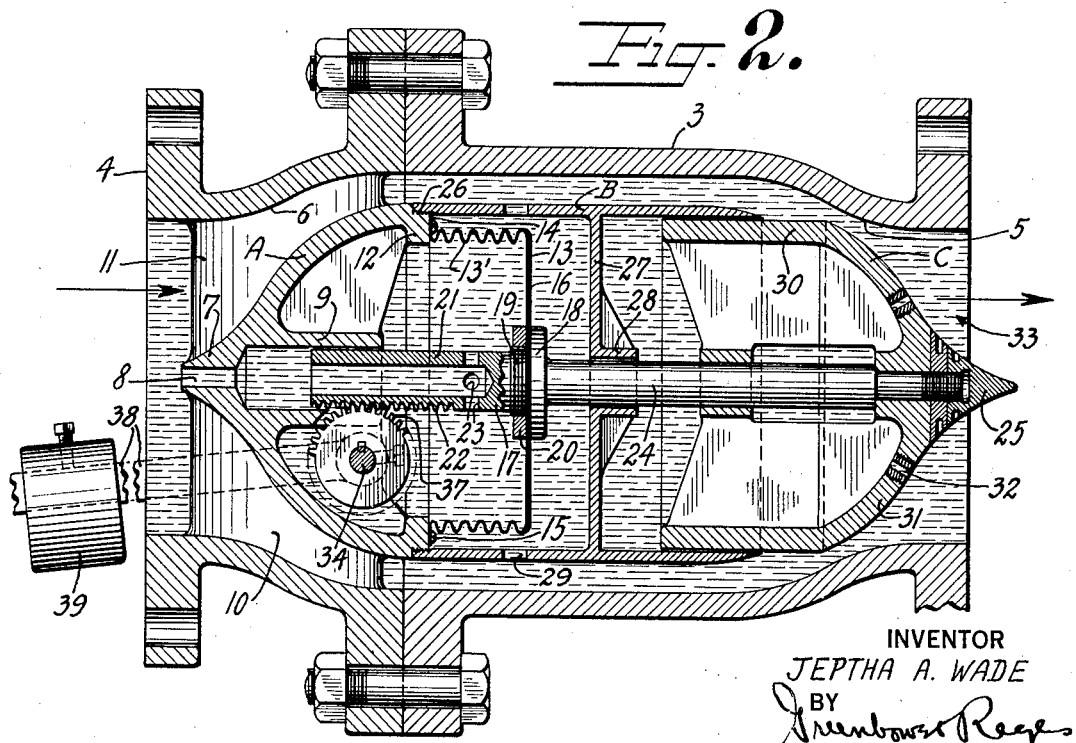
INVENTOR
JEPTHA A. WADE
BY
ATTORNEYS Patented Nov. 28, 1933

1,936,650

UNITED STATES PATENT OFFICE 1,936,650

VALVE

Jeptha A. Wade, Maplewood, N. J.

Application May 13, 1931. Serial No. 536,999

7 Claims. (Cl. 137—152.5)

This invention relates to automatic controllers for maintaining a uniform rate of flow of fluids and more particularly to controllers used in filtration systems or plants for automatically maintaining the rate of filtration uniform at all times.

Many different kinds of industrial plants, such as water works, filtration plants, water treatment plants, and the chemical industries, require uniform flow conditions to be maintained in the conduit systems through which the water or chemicals may be flowing. In order to control and maintain the flow conditions uniform, controllers of various types are available but the device hereinafter described and for which a patent is solicited is an improvement over any controller of which I am aware in that it takes up less space, absorbs less head and is accurate, dependable, simple in construction, and inexpensive to manufacture.

Filtration plants, for example, comprising one or more units consisting of tanks containing beds of sand, stone, and the like through which flows the water to be filtered, would deliver filtered water at a rate depending on the net head on the filter. However this net head changes due generally to the increasing resistance offered the flow of water as the filtering medium becomes more and more clogged with sediment. As this loss of head increases obviously the rate of flow of the filtered water in the outlet or affluent side of the filter tends to become less and less. Changes in the net head may also occur due to a change in water level either on the filter or in the basin into which the filter effluent pipe discharges.

In order to compensate for any change in the head on the filter it has been the practice to provide an automatic controller in the system with the object of effecting a compensating change in the head losses in the connecting conduits so that the net head in the system is kept as near constant as possible, thus resulting in the maintenance of a uniform rate of flow of the fluid. It is of great importance that such a device shall introduce losses of head only when necessary to reduce the flow and that, when the filter becomes clogged, there should be no loss due to the device. In this way not only are pumping costs reduced but the "length of the run" of the filter is increased with resulting economies in attendance and consumption of water for washing filters. However, such valves of which I am aware which operate for this purpose are so constructed as to introduce a considerable loss of head through the formation of strong eddy currents.

Therefore, it is an object of my invention to provide a controller for automatically maintaining a uniform rate of flow of a fluid, so designed as to reduce to a minimum eddy currents which result in an appreciable loss of head.

A further object of my invention is to provide an automatic controller for filtration plants and the like which is simple in construction and effective in operation to maintain a uniform rate of flow as the head increases or decreases.

Other objects of the invention will become more apparent by reading the accompanying description taken in connection with the accompanying drawing in which Fig. 1 is a transverse cross-sectional view of the invention showing the valve in its fully open position;

Fig. 2 is a cross-sectional view taken on line II—II showing the valve in a semi-closed position; and Fig. 3 is a cross-sectional view taken on line III—III Fig. 1, illustrating the stream-line design of the supporting ribs for the operating chambers.

The body of the controller comprises detachably connected casings 3 and 4 which taper toward their free ends 5 and 6, which casings are connected to fluid conduits not shown. Disposed within the casings 3 and 4 is the valve structure with operating chambers comprising three parts A, B and C. The parts A and B are mounted in fixed position within the casings 3 and 4 while the part C is slidably mounted in the part B. The space between the casings and the operating chamber forms an annular fluid way of a gradually diminishing area from the entrance of the controller to the central portion surrounding the intermediate section B, and then of a gradually increasing area to the exit of the valve. The fluid way is, therefore, in the form of a Venturi tube. As a result of this design of the fluid way the fluid pressure adjacent the section B is considerably less than at either the inlet or the exit ends of the valve in accordance with Bernoulli's equation. By properly shaping the fluid way, the pressure at the discharge end of the controller will be restored to very nearly the same magnitude as at the entrance so that the only head loss inherent in the controller is that due to friction.

The part A consists of a conical shaped hollow casting with the apex 7 thereof pointing toward the direction from which the fluid flows. The apex 7 has a centrally disposed opening 8 communicating through an inwardly tubular boss 9 with the interior of the part A. The part A has several supporting ribs 10 and 11 for properly positioning the part A concentrically within the casings 4 and 5. These ribs are stream lined in cross section as illustrated in Fig. 3. The part A has secured to an inturned flange 12 a yieldable member 13 which for illustrative purposes is shown in the drawings as a sylphon consisting of a flexible corrugated wall 13' terminating in a flange 14 secured by screws 15 or in any other manner making a water tight connection to the flange 12.

The outer side of the sylphon is closed by a relatively stiff wall or piston 16 to which is rigidly secured a plunger 17. The plunger 17 has a flange 18 resting against the one side of the wall or piston 16 and a threaded section 19 which engages a nut 20 for firmly clamping the plunger to the wall or piston 16.

The plunger 17 consists of two shanks extending in opposite directions from the wall or piston 16. The shank 21 consists of a tubular or hollow member having a rack 22 along one side thereof. Communicating openings 23 are provided in the shank 21 so that the pressure of the water in the entrance end of the casing 4 may be communicated to the one side of the stiff wall or piston 16.

The other shank 24 of the plunger 17 extends in an opposite direction from the shank 21 and is secured by means of a nut 25 to the part C.

The part B comprises a cylindrical casing threadedly or otherwise secured at 26 to the part A. This part carries a rigid diaphragm 27 having a centrally disposed bearing or bushing 28 through which the shank 24 slides. The part B is also provided with several openings 29 in the circumference thereof for permitting the fluid in the fluid way between casing 3 and the part B to enter the part B and function against the wall or piston 16.

From the foregoing description it will be apparent that the wall or piston 16 is continually subjected on opposite sides to two pressures which will differ from each other by an amount changing only as the velocity of flow in the fluid way changes and that any leakage from one to the other which would tend to equalize the pressures on the two sides, is prevented or reduced to a point where it is of no consequence. The fluid way being, in effect, a Venturi tube, of fixed dimensions, there is a constant ratio between the velocities at the entrance and at the throat which surrounds part B resulting in a constant pressure difference for a given entrance velocity or, which is the same thing, for a given rate of flow. This difference in pressure is commonly called the Venturi head. Advantage may be taken of this fact to connect an ordinary differential U-tube to the casing at points near the entrance and opposite part B and by this means to measure the quantity of fluid passing through the controller.

The part C is a valve mounted on the shank 24 of the plunger 17 which in turn is mounted in the two bed rings 28 and 9. It comprises a cylindrical portion 30 of lesser diameter than the interior diameter of the part B into which it fits loosely and a conical or stream-lined shaped end portion 31, the nut 25 being also stream-lined in configuration to continue the stream-lined form of the portion 31 of the part C and, when fully open, of the outer surface of part B.

This stream-line structure is maintained throughout the fluid way and prevents the formation of appreciable eddy currents with their attendant loss of head, so that the Venturi head is recovered and the pressure at the discharge end of the controller may be practically the same as at the entrance and will be so when the controller is in the open position. The part C is also provided with one or more openings 32 so as to admit water to the interior of the part C from the end 33 of the casing 3 so as to equalize the pressure on both sides of the part C. By adjusting the size of these openings a regulable dashpot is obtained and "hunting" may be prevented but these openings may be omitted if sufficient clearance is provided between parts B and C, as will be obvious to those skilled in the art.

It is apparent from the foregoing description that any movement of the wall or piston 16 will cause a movement of the plunger 17 and consequently a movement of the part C. Part C now acts as an obstruction introduced into or withdrawn from the fluid way and the varying losses of head caused by the varying size of the obstruction may be made to compensate for any change in head occurring elsewhere in the system.

Whenever there is any flow through the controller, the pressure on the side of the wall or piston 16 towards the diaphragm 27 will be less than on its opposite side and there is a constant tendency for it to move toward the diaphragm 27, causing part C to shut off the fluid way. To maintain the position of part C so that a given desired quantity will flow through the controller there may be provided a weighted lever system comprising a shaft 34 mounted in a bearing 35 in the casing 4 and a bearing 36 in the part A, this shaft passing through an opening in one of the supporting ribs 10, 11 etc. Within the part A the end of the shaft 34 is provided with a pinion 37 which engages the rack 22 and at its opposite end the shaft is provided with an arm 38 upon which is slidably and adjustably mounted a weight 39. The arm 38 may be provided with a scale, as common in the art, and the weight 39 may be placed at various points on the scale so that it will balance the differential pressure on the wall or piston 16 resulting from various rates of flow through the controller. As the weight travels through only a small arc, its moment about the shaft center remains practically constant, thus the differential pressure on the wall or piston 16 which will be balanced by the weight does not change appreciably for any position of the valve C and whenever the differential pressure changes due to a change in velocity in the fluid way, then the wall or piston 16 moves until the valve C moves sufficiently to restore the rate of flow for which the valve has been set.

Although a weighted lever system has been illustrated and described for presetting the rate of flow, mechanical equivalents thereof may be employed as may be obvious to those skilled in the art. It is also apparent that the valve may be operated in a vertical or any other position by proper change in the positioning of the weighted lever arm. A packing nut 40 may be provided to prevent the escape of water around the shaft 34.

The operation of the valve is as follows: The casings 3 and 4 having been secured together and attached, for example, to the effluent of a filtration plant, the pressure of the water in the inlet side of the casing 4 may be at a value depending upon the head in the filtration bed or tank. This pressure will be exerted against the wall 16 forcing the same outwardly. Inasmuch as the cross-sectional area of the fluid way within the casing 3 adjacent the openings 29 is less than that at the entrance to the casing 4, the pressure will be less, and this pressure will be exerted against the opposite side of the wall or piston 16. If no compensating means such for example as the weighted lever 39 were provided, the greater pressure on the one side of the wall or piston would cause the part C of the valve to move to a position to almost close the exit opening 33 of the valve. The differential pressure which tends to move the piston will vary with a function of the velocity of the fluid in the fluid way and by properly adjusting the weight 39 this differential pressure may be balanced for any desired rate of flow and the part C maintained in such a position as to provide for the continuance of this rate of flow. Should the pressure or head fall it is desirable to enlarge automatically the discharge opening 33 so as to compensate for this loss of head and this will be accomplished automatically since any reduction in velocity in the fluid way results in a reduction in the differential pressure which will no longer balance the weight 39, the latter moving downward and thus causing a movement of the valve C to a position where the velocity in the fluid way will be restored. Similarly, if there is an increase in the head, the velocity increases, the differential pressure overbalances the weight 39 which is raised, the valve C moves out into the fluid way, the head loss is increased and the velocity restored to the desired value.

Inasmuch as the design of the outlet opening and the outer side of the part C is such as to prevent the formation of eddy currents and to offer a minimum of resistance to the flow of the fluid, no loss of head occurs through the action of the controller or its design.

No orifices, sudden enlargements, eddies, etc. are involved in the operation of the controller and the drop in pressure inherent in a Venturi tube is recovered so far as practicable with stream-line flow maintained throughout.

It will be appreciated from the foregoing description that I have provided a controller which in its fundamental aspects comprises a Venturi tube having a throat annular in section surrounding a chamber separated into two isolated sections by a surface against which can be exerted the differential pressure resulting from the flow of a fluid in a fluid way possessing the characteristics of a Venturi tube, together with means or an opposing force for balancing that difference in pressure. Means are also included for automatically introducing a variable obstruction into the fluid conduit so as to maintain a uniform rate of flow of the fluid therein.

Although the invention has been described specifically in connection with filtration systems, it is obvious that it may have application in many other arts. In addition modifications of the invention may occur to those skilled in the art, however, such modifications are contemplatd as come within the scope of the appended claims.

What is claimed is:

1. In a controller of the character described, the combination with a casing of an internally concentric cylinder spaced therefrom and arranged with respect to each other to form a Venturi tube having a throat annular in section, said cylinder consisting of a fixed part and a movable part, the fixed part separated into two chambers by a movable member connected to the movable section by a plunger, whereby said movable section may be caused to operate when the difference in pressure on opposite sides of the movable member changes.

2. A rate of flow controller comprising a casing having a cylindrical central portion and converging end portions, a valve body disposed concentrically within said casing and spaced therefrom to form a relatively small annular passageway along the cylindrical section of the casing and larger annular passageways adjacent the converging end portions of said casing, said valve body having a movable section capable of movement to alter the pressure conditions in said small annular passageway, and means connected to said movable member subjected to the pressure of the fluid in said small passageway and also subjected to the pressure in one of said large annular passageways, whereby when the pressure conditions in either passageway varies the movable section will be caused to operate.

3. A rate of flow controller comprising a cylindrical casing, a valve body of cylindrical form disposed concentrically within and spaced from said casing, said valve body having stream line end portions, one of which is fixed in position and the other of which is movable, means within said valve body connected to said movable end portion, means for admitting fluid from between said valve body and casing to one side of said first-mentioned means and means for admitting fluid from the casing adjacent the fixed end portion of the valve body to the other side of said first-mentioned means, whereby upon a variance in pressure conditions in the fluid at either of the points specified a change in the position occupied by said movable end portion will take place.

4. In a controller of the character described, the combination with a casing of a cylindrical valve body having stream-line end portions spaced from the casing and concentrically disposed with respect thereto to form a Venturi tube having a throat and mouth, one of said stream-line end portions being movable and the other being fixed, means within said valve body connected to said movable end portions, said means being subjected to pressure of the fluid in said throat and mouth, and means for compensating for the difference in pressure between the fluid in the throat and mouth of said Venturi tube, whereby when a difference in pressure occurs between the throat and mouth greater or less than the initial difference in pressure the movable end portion will adjust itself so as to restore the initial difference in pressure.

5. In a controller of the character described, the combination of a valve body and a casing surrounding the same, the valve body and casing being so shaped and spaced from each other as to form a Venturi tube having a throat and a mouth, a movable element within the valve body, passageways in the valve body to admit fluid pressure to each side of said element, one of said passageways being open to the fluid in the throat of said Venturi tube and the other of said passageways being open to the fluid in the mouth of said Venturi tube, means connected to said element for compensating for the difference in fluid pressure in said mouth and throat, and means connected to said element for compensating for any change in such difference in pressure, whereby the rate of flow of fluid through said throat is maintained substantially constant.

6. In a rate of flow controller, the combination of a casing and a valve body concentrically disposed therein and spaced therefrom to form an annular fluid way of smaller cross-sectional area than the cross-sectional area of the casing adjacent the ends of said valve body, whereby a fluid passing through said casing will have a higher velocity in the smaller section of the casing than in the section adjacent the end of the valve body thus producing a Venturi head, means within said valve body responsive to said Venturi head, a streamline movable member connected to said means and operative by a change in said Venturi head, and means connected to said means for initially balancing a predetermined Venturi head, whereby when said Venturi head varies the movable member will become adjusted to return the Venturi head to its initial value.

7. In a rate of flow controller, the combination with a casing of a valve body concentrically disposed with respect thereto and spaced therefrom to form a Venturi tube, said valve body having a cylindrical central portion and end portions of stream line contour, one end portion being fixed and the other end portion being movable, a movable partition in said cylindrical portion of the valve body connected to said movable end portion, a weighted lever system connected to said movable partition, a passageway in said cylindrical portion for admitting fluid from the throat of said Venturi tube to one side of said movable partition and a passageway in the fixed end portion for admitting fluid from the mouth of said Venturi tube, whereby a change in velocity of the fluid in the mouth and throat of the Venturi tube will be effective upon said movable partition to maintain the rate of flow of the fluid constant through said throat of the Venturi tube.

JEPTHA A. WADE.